Jan. 2, 1934. W. O. AMSLER 1,941,778
METHOD OF AND APPARATUS FOR MAKING GLASS
Filed July 28, 1931 5 Sheets-Sheet 1
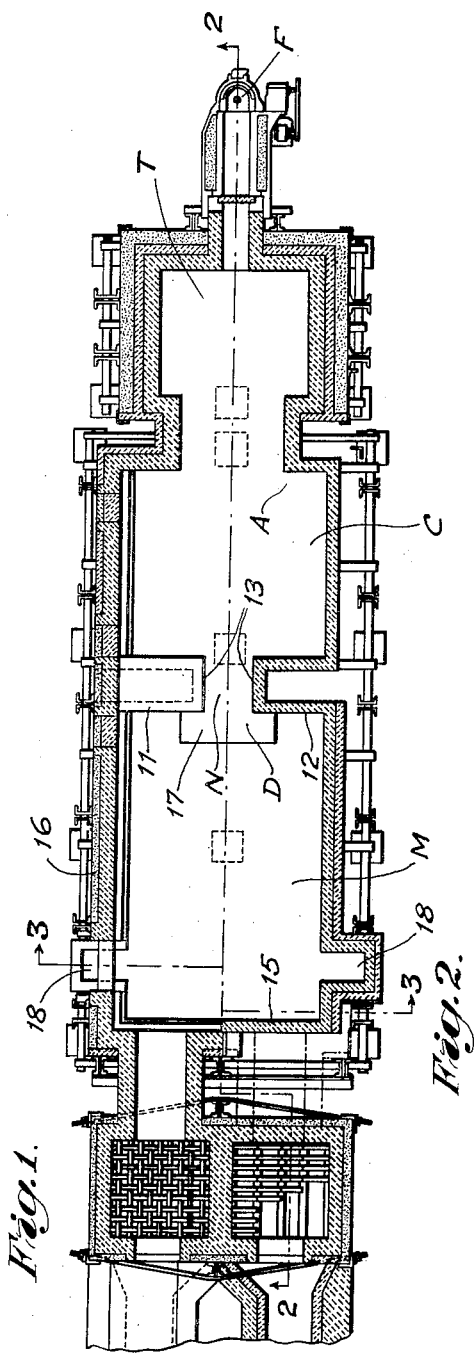
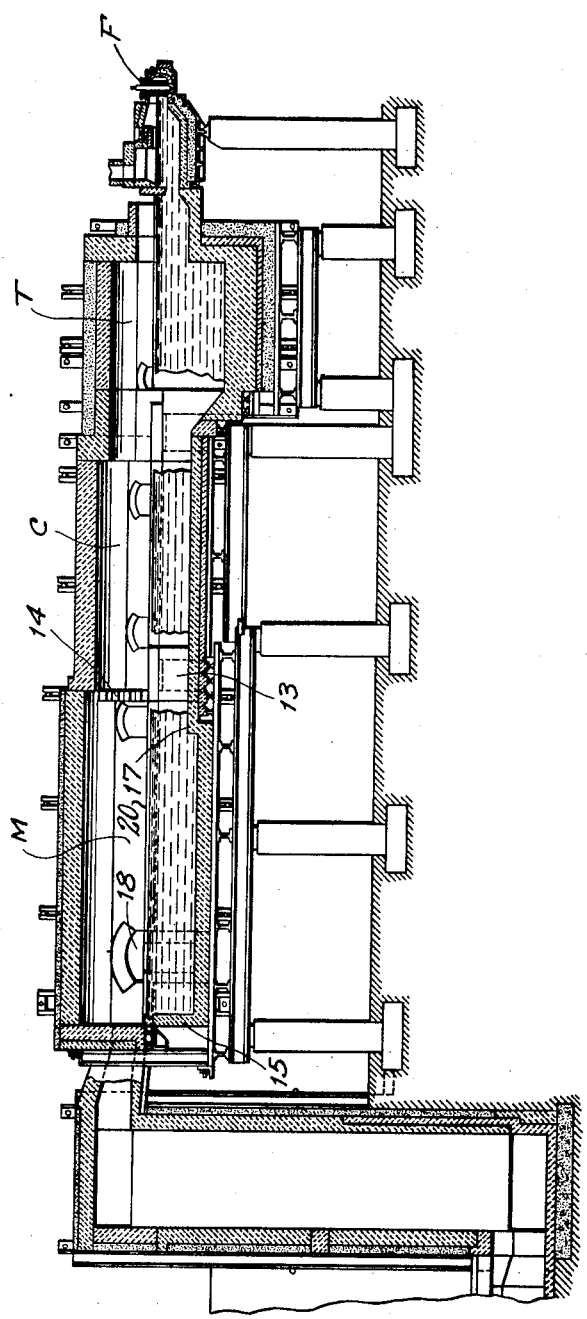
Witness;
W. B. Thayer
Inventor;
Walter O. Amsler
by Brown & Parham
Attorneys Jan. 2, 1934.   W. O. AMSLER   1,941,778
METHOD OF AND APPARATUS FOR MAKING GLASS
Filed July 28, 1931   5 Sheets-Sheet 2

Inventor:
Walter O. Amsler
by Brown + Parlow
Attorneys

Witness:
W. B. Thayer.

Jan. 2, 1934.  W. O. AMSLER  1,941,778
METHOD OF AND APPARATUS FOR MAKING GLASS
Filed July 28, 1931  5 Sheets-Sheet 3
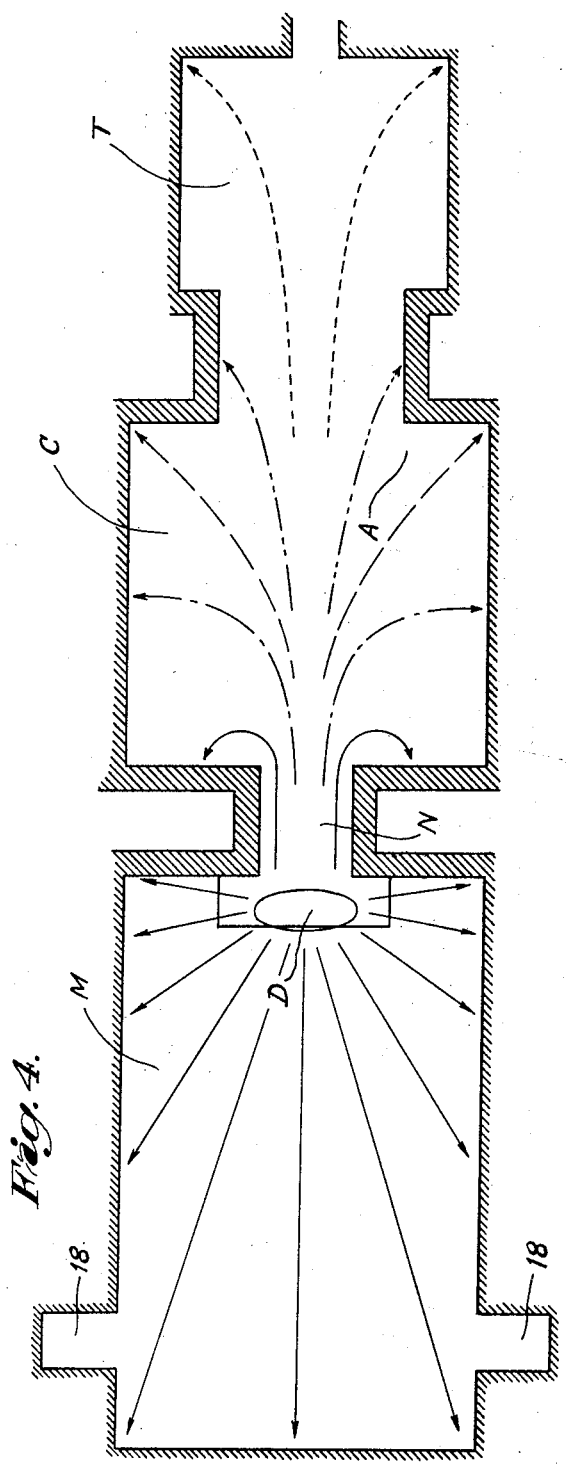
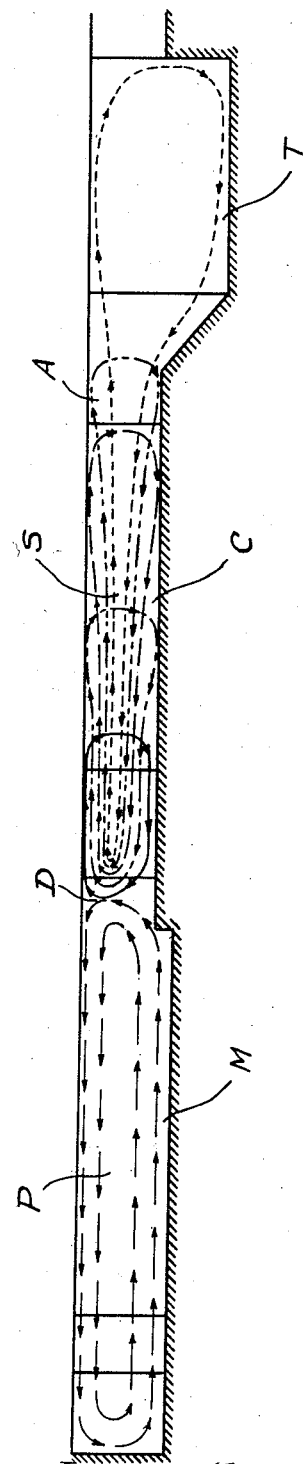
Inventor;
Walter O. Amsler
by Brown & Parham
Attorneys
Witness;
W. B. Thayer

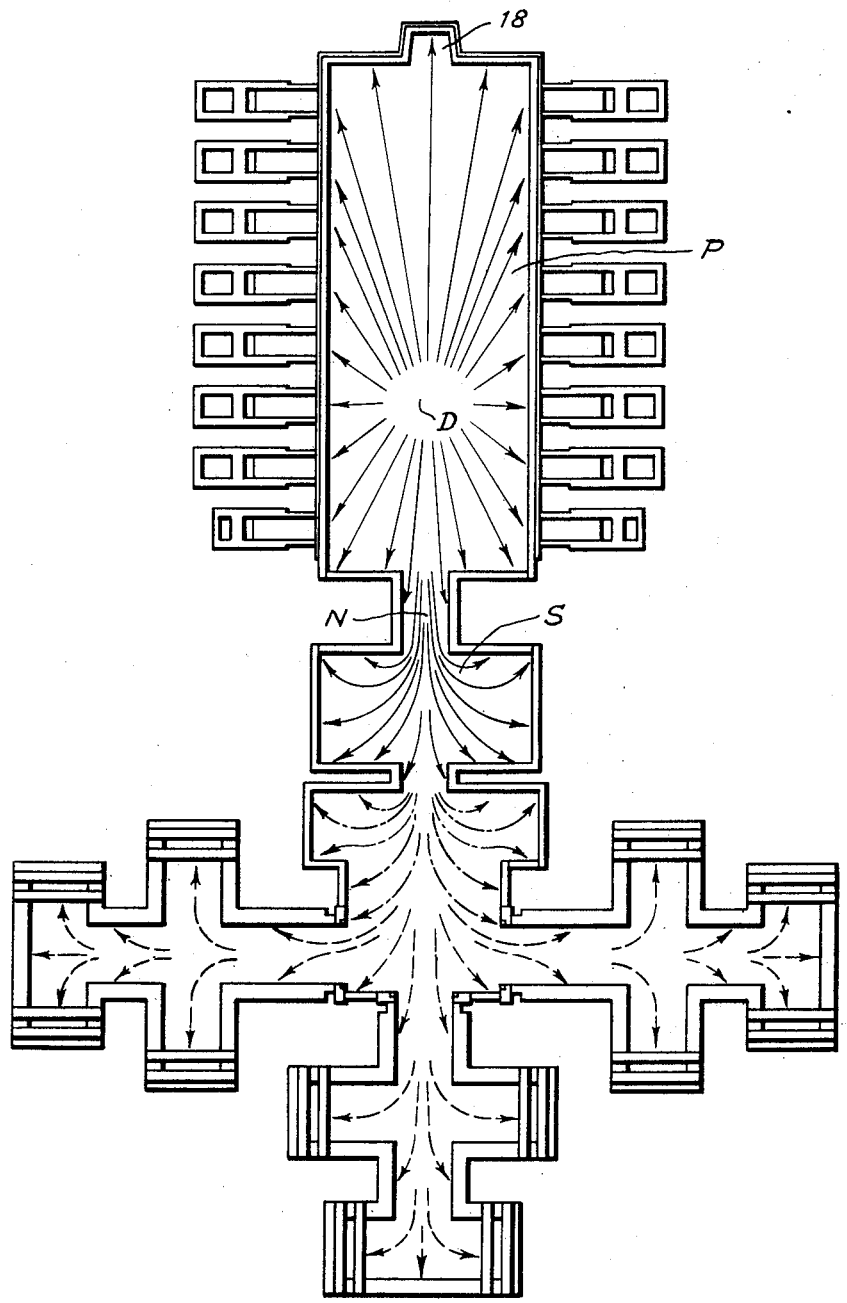

Patented Jan. 2, 1934

1,941,778

UNITED STATES PATENT OFFICE 1,941,778

METHOD OF AND APPARATUS FOR MAKING GLASS

Walter O. Amsler, Toledo, Ohio, assignor to Simplex Engineering Company, Washington, Pa., a corporation of Delaware Application July 28, 1931. Serial No. 553,531

8 Claims. (Cl. 49—54)

The present invention relates to novel methods and apparatus for the efficient melting and refining of molten glass in a fuel-fired continuous furnace.

It is a fact well recognized in the industry that continuous furnaces heretofore employed have been highly inefficient, and that even when operated at their best, a very large percentage of the glass produced has been of secondary or poor quality.

For example, in the window glass industry, a tank has heretofore been considered as operating well when it produced 25% "A" quality glass, that is, glass which was substantially free from seeds, stones, cords or bubbles. The percentage of good glass in such tanks could rarely be raised above 25%, and then only when the tank was "pulled" at a rate so low as to greatly decrease the efficiency of the operation.

One of the basic reasons for the past inefficient operation of continuous furnaces has resided in the absence of adequate control of the convection currents present in the glass during the melting and refining operations. This lack of control has heretofore manifested itself in an improper distribution of the two principal circulations in the furnace. These two circulations may be designated as the "primary circulation", involving the movement of the surface glass away from the "hot spot" toward the rear wall of the furnace, and the "secondary circulation" in which the surface glass moves from the "hot spot" forwardly of the furnace.

I have discovered that it is essential to efficient operation that the primary circulation extend over a substantial portion of the tank, as a long path for this circulation renders the operation far more stable than it has been heretofore, giving ample opportunity for complete fusion and elimination of the large proportion of the gases in each portion of the glass prior to the passage of such portion into the secondary circulation. This also permits a more substantial homogenizing or intermixing of the various silicates formed by the fusion of the glass making batch.

In the making of glass by the continuous process, certain essentials must be constantly kept in mind. There must be some spot in the melting end at a sufficiently high temperature to rapidly and efficiently reduce the batch to glass. This temperature may be different for different glasses, and all glasses may be rapidly melted at temperatures higher than that usually selected as the melting temperature therefor. The melting temperature is, however, usually selected as that at which the best balance is maintained between the speed of fusion desired and the destruction of the refractories forming the tank. For example, in certain types of window glass commonly made in this country, the best melting temperature is accepted as approximately 2650° F. and this is the temperature for that particular glass which should be present at what is hereinafter referred to as the "hot spot".

It is equally essential that at another point forwardly of the tank, the glass be reduced in temperature, which temperature at that point is usually maintained constant for the reason that if the temperature is constant at that point, which is the point at which the melting and refining is subsantially completed, the temperature of the glass, when delivered to the fabricating machine or to the drawing apparatus, is that proper for the working of that apparatus. In the case of the window glass, above referred to, the second temperature is approximately 2300° F. at the point at which the glass leaves the refining portion of the furnace and passes into the withdrawal compartment from which it is worked out by any of the known methods. At this, or a corresponding, point in a different furnace, the exact temperature not only varies somewhat with the characteristics of the glass being used, but obviously varies somewhat with the use to be made of the glass when withdrawn from the tempering chamber, but for any given operation and given glass, the temperature should remain constant at this point. Hereinafter, this point will be referred to as the "cool spot".

In the furnaces of the bridgeless type heretofore used, the heat introduced into the melting end of the furnace and the radiation from the walls of the furnace have been the only means for regulating the temperature, both at the hot spot and the cool spot, and the relative locations of these two spots. As it is essential that the cool spot remain at the same temperature and at the same place in the furance if continuous good glass is to be made, it follows that variations in the heating or cooling arrangements will result in a movement of the "hot spot" longitudinally of the tank.

In the prior art bridgeless tanks in order to maintain the cool spot at its proper temperature, it has heretofore been necessary to maintain the hot spot proportionately quite close to the rear end of the furnace, and to thus greatly shorten the primary circulation and proportionately lengthen the secondary circulation.

Heretofore, moving the "hot spot" further down the furnace has failed to result in improved conditions, as the movement of this spot forwardly has automatically increased the temperature in the cool spot. Manufacturers have sought to overcome this difficulty by lengthening the entire furnace structure. This has been particularly true in the window glass art where the tanks have grown to enormous size, but this expedient has proven unsatisfactory for the reason that the increase of the size of the tank as a whole has increased the capacity, the necessity for more fuel, and has effected little or no change in the proportional location of the "hot and cool" spots. Such furnaces have proven themselves as quite unstable and subject to decided and very deleterious changes in their operation by reason of slight variation in the firing or radiating conditions.

In the prior tanks which were provided with bridge walls, the hot spot was maintained relatively close to the rear wall of the melting compartment for the reason that any substantial movement of the hot spot toward the bridge wall tended to eliminate the secondary circulation and to cause insufficiently fused and refined glass to pass through the throat into the separate workout chamber in which the conditions were such that no substantial refining could take place.

It is the principal object of the present invention to provide an arrangement of, and method of operation for, continuous glass melting tanks which provide a proper distribution longitudinally of the tank of the primary and secondary circulations, while maintaining constant the size and capacity of the tanks, with a resulting large increase in the proportionate production of first quality glass.

Otherwise expressed, this object involves the provision of an apparatus in which the convection currents in the glass during the melting and refining thereof are properly controlled and which hence permits a greatly increased speed of operation and the increased proportionate production of first quality glass.

More specifically, my invention provides a furnace in which the surface glass is permitted to flow without obstruction both forwardly and rearwardly of the "hot spot" in the furnace, and in which a short path for the secondary circulation and a long path for the primary circulation are provided as compared to the prior practices. This division of the tank into zones of primary and secondary circulations is the exact opposite of the practice heretofore followed.

It has been found that the inclusion of such production of "A" quality glassware as much as 300%.

As a preferred means for obtaining the desired control of convection, I provide a substantial and selected heat separation above the glass line between the melting chamber of the tank in which the primary circulation takes place and a cooling chamber into which the secondary circulation extends. Thus I am enabled to separately select and control the heat gradients in zones of the two circulations whereby I not only obtain the desired convection currents, but do so with a substantial saving in the heat applied to the furnaces.

More specifically, in a furnace of my invention I provide a cooling chamber communicating with a heating chamber by a relatively narrow neck, which neck together with the heat separating means associated therewith, facilitates the location of the "hot spot" near the forward end of the melting zone, provides additional wall surface for the cooling chamber, and aids in the maintenance of a sharper temperature gradient between the "hot spot" and that chamber.

Other objects of my invention will appear from the following specification when considered in connection with the accompanying drawings, in which are illustrated two different forms of tanks to which my invention has heretofore been applied with the markedly improved results.

Figure 1 is a horizontal section of a relatively small tank taken on the line 1—1 of Fig. 3;

Fig. 2 is a vertical section on the line 2—2 of Fig. 1;

Figs. 4 and 5 are diagrammatic plan and vertical sectional views, diagrammatically indicating, in a somewhat idealized manner, the path of a given modicum of glass melted in the tank of Figs. 1 to 3 inclusive.

Fig. 6 is a horizontal section of a large window glass tank as the same has been modified by the application of my invention thereto, in which the surface currents have been indicated;

Figure 3:
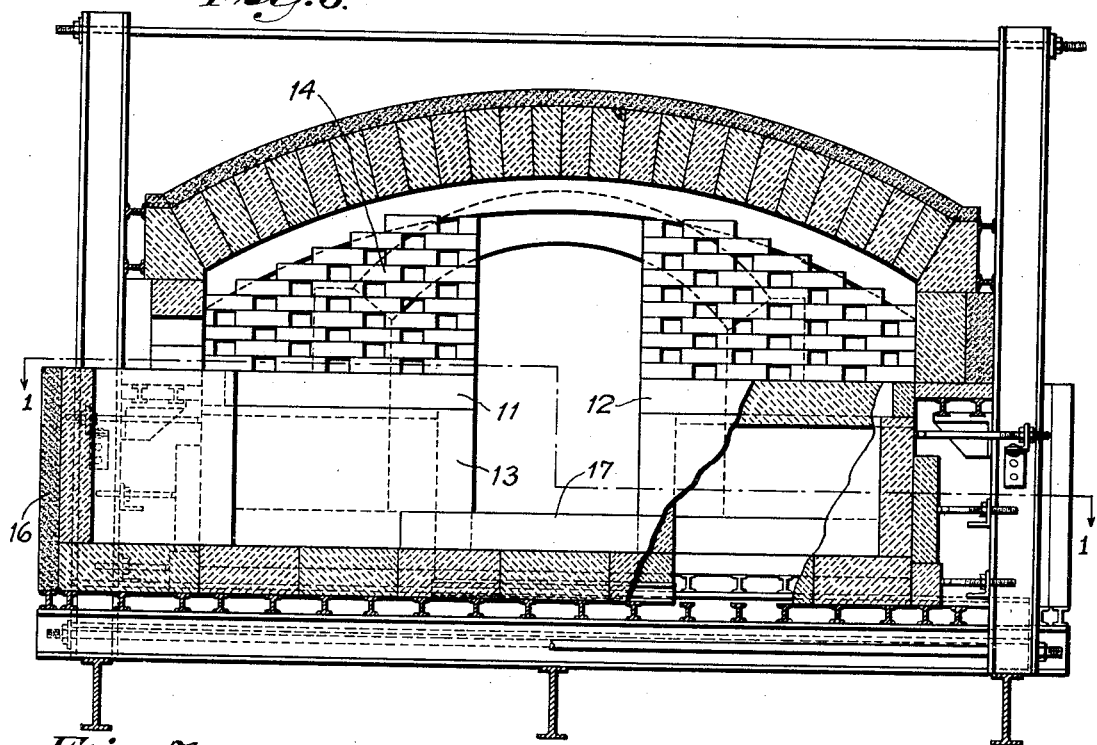
Fig. 3 is a section on the line 3—3 of Fig. 1.

Referring more particularly to Figs. 1, 2 and 3, the furnace is shown therein as comprising a melting chamber M, a cooling chamber C, and a tempering compartment T, from the latter of which glass passes to a feeder F, by which the glass forming machinery may be fed. Obviously, the chamber T may communicate with a drawing chamber, such as is indicated in Fig. 6, if the furnace is to be used for the manufacture of window glass rather than for containers or with a suction gathering pool.

The chambers M and C are partially separated by walls 11 and 12 which extend inwardly from the sides of the tank and have end wall portions 13 which define a neck N which, for reasons herein pointed out, is preferably from 10% to 35% as wide as the tank. It is believed that a tank having a neck of width approximately 15% to 20% of width of the melting chamber will provide the optimum condition, though greatly improved results, as herein pointed out, are obtained by the provision of necks up to 50% of the width of the tank.

The walls 11 and 12 may extend to the roof of the tank, or if desired, may extend merely above the normal glass level 20 (see Fig. 2) and may carry shadow walls 14 which heat separate the chambers M and C to any desired extent.

The principal purpose of the upper extension of the walls or the provision of the shadow wall is to exclude to a greater or less degree the products of combustion and radiated heat of the melting chamber M from the cooling chamber C, and the extent to which these walls should separate these two chambers may be calculated and a wall provided which is best related to the radiation through the walls of the cooling chamber.

As shown in Figs. 1 and 2, the furnace is provided with an end firing regenerator which projects a horse-shoe flame into the melting chamber. Preferably, the firing mechanism is so adjusted that the greatest heat on the surface of the glass is developed immediately back of the walls 11 and 12, and it is considered imperative that this point of greatest heat be located forwardly of the rear wall a distance equal to at least 60% of the distance between the rear wall of the melting chamber and the walls 11 and 12. My invention contemplates, among other things, that the "hot spot" be placed sufficiently far forward of the rear end of the melting chamber that at least 60% of the glass under the fire lies rearwardly of the spot, and within this limitation the nearer the "hot spot" approaches the neck the better.

To obtain the best result, it is desirable that the rear wall 15 of the melting chamber radiate heat to the outside of the furnace at a greater rate than the other walls of that chamber. This may be accomplished either by using a wall of less thickness at this point, or by insulating other portions of the chamber, as indicated at 16. The provision of greater radiation at the rear wall increases the activity of the longer components of the primary circulation.

As shown in Fig. 2, I prefer to raise the bottom wall 17 of the tank at a point just rearwardly of the neck, as this assists in locating and maintaining the "hot spot" at a point closely adjacent the neck, as at D. This provision is not essential but merely furnishes an added control of the convection currents, which I have found desirable.

Because of the great wall surface in the cooling chamber C, as indicated in Fig. 1, and by reason of careful calculation and selection of the radiating characteristics of the walls of that chamber, this chamber may be made much shorter than would otherwise be required for a furnace not provided with the heretofore described features. By these provisions I am able to obtain a rapid drop in temperature between the "hot spot" D and the "cool spot" A at the forward end of the chamber C without waste of fuel.

As a result of the location of the "hot spot" above referred to and of the sharp drop in temperature between that spot and the "cool spot" at the forward end of the cooling chamber, I obtain a long and active primary circulation which assures that the batch fed in through dog-houses 18 is thoroughly fused and is repeatedly carried through this primary circulation until a large proportion of the included gases has been eliminated.

This is illustrated in Fig. 5 wherein the primary circulation is indicated at P, the arrows showing the manner in which a particular moiety of batch circulates in a generally orbital path, repeatedly rising to the surface of the glass bath, each time at a point closer to the "hot spot" until it finally passes into the secondary circulation, indicated at S.

The speed at which gases may be removed from glass is believed to be a function of the number of times that the glass rises to the surface of the bath, and in my system I depend primarily upon a circulation which brings each portion of the glass to the surface a large number of times, 8 to 10 for example, rather than as has heretofore been the practice to depend to a large extent on the elimination of bubbles through their rising through the glass due to the difference in specific gravity between them and the glass.

After the glass enters the secondary circulation, it is passed repeatedly in both directions through the neck, and I have ascertained that when a tank of my invention is operating at its full capacity, much more glass passes through the neck than is withdrawn in the same period of time from the tank. In fact, it is believed, within reasonable limits, that the greater the difference between the weight of glass passing the neck and the glass withdrawn from the furnace, the better the glass. In my experiments, I have ascertained that the glass passing forwardly through the throat should be at least eight times by weight that which is withdrawn from the furnace during the same period.

Obviously, the diagram of Fig. 5 is somewhat idealistic, and I am unable, in the nature of things, to accurately show the precise paths through which individual particles or portions of glass travel, though the distribution of these paths laterally of the furnace is indicated by the arrows in Fig. 4. Thus, in addition to the spiral movement indicated in Fig. 5, the glass and batch in the primary circulation travel transversely of the furnace in a plurality of paths. These movements not only effectively bring the glass repeatedly to the surface of the bath and eventually into the secondary circulation, but also mix the glass and homogenize it to a very large extent.

Figure 7:
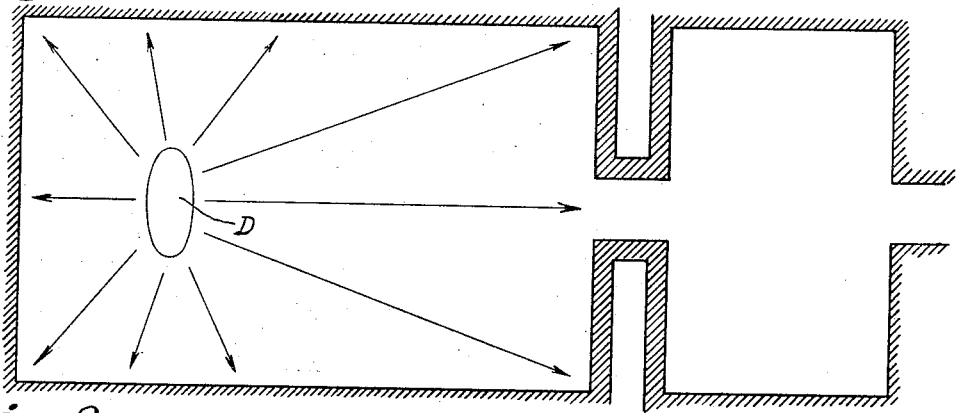
Figs. 7 and 8 are diagrammatic views of a standard prior art tank in which a bridge wall is employed such as is normally used in the manufacture of containers, in which the convection currents have been indicated in a manner similar to that employed in Figs. 4 and 5.
Figure 8:
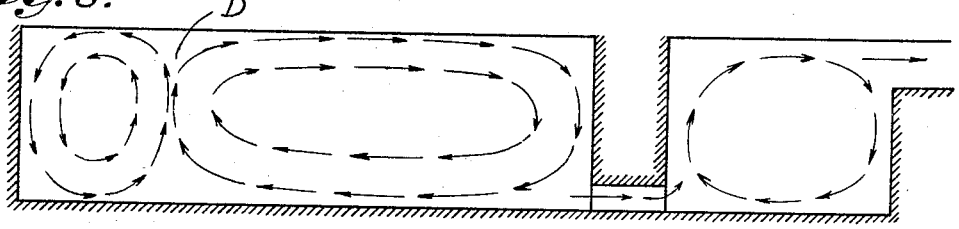

A further desirable effect is obtained by the activity and wide spreading of the primary circulation, namely, the maintenance of the piles of unmelted batch rearwardly of the neck, the surface tendency being to force floating batch toward the rear wall. While a similar tendency existed in certain of the prior art tanks, the condition in those furnaces was such an unstable one that frequently the slightest change in heat condition would force unmelted batch, or inadequately melted batch, almost immediately into the secondary circulation (Figs. 7 and 8). Such a condition is practically impossible in a furnace embodying my invention. Also, frequently the "hot spot" in the old furnace was so close to the rear wall that there was not space behind it to hold all of the unmelted batch in the primary circulation, and, with such a short primary circulation, given particles of glass did not circulate sufficiently often to be completely melted and refined before being drawn into the secondary circulation.

After the glass passes into the secondary circulation, it repeatedly flows through the neck toward the cool walls of the furnace chamber and back toward the "hot spot", progressively coming to the surface further and further away from the "hot spot" until it passes through the tempering chamber T to the feeder. If by any chance, and in spite of the long and active circulation in the primary zone, non-homogeneous glass or glass which has not been adequately refined passes into the secondary circulation, it is given the opportunity of releasing its gases and further refining by reason of this secondary circulation. As this secondary circulation includes the repeated passage of the glass through the restricted neck, this circulation accomplishes a complete homogenizing of the glass as well as the final and complete elimination of all of the gases that are not actually absorbed by the glass. The spreading and contraction of the stream passing from and to the neck and also the rapid and repeated decrease and increase in glass temperature are important agencies in effecting complete refining.

By the arrangement above described, in which it is assured that the batch is thoroughly melted and fairly well refined in the primary circulation and is completely refined and homogenized in the secondary circulation at a speed far in excess of the rate at which this work has been done heretofore, I not only largely increase the rate at which the glass is made, but I assure a much greater proportion of "A" quality glass and accomplish this with a substantial saving of fuel.

In the tank of Fig. 1, the secondary circulation extends through and is active within the chamber T, as well as the chamber C, though this extension of the circulation is relatively unimportant as the glass is completely melted and refined and is at a temperature so low that the viscosity greatly reduces its movement. By restricting the passage from the chamber C to T to a greater extent than that shown in the drawings, a greater wall surface and greater cooling effects in the chamber C may be obtained. The use of a plurality of necks and cooling chambers is indicated in Fig. 6.

Broadly speaking, the principle of my invention, while best applied by the use of a neck N, is not necessarily dependent upon the provision of a neck, though the advantages of my invention are best realized when a suitable neck is employed. So long as a sufficiently long and active primary circulation is provided, together with an active secondary circulation between the hot spot and a cool spot, between which two spots the drop in temperature is sufficiently sharp, excellent glass may be made, though not necessarily in the economical manner in which it is accomplished by the use of tanks of the character heretofore described. The use of a neck is peculiarly advantageous in localizing and maintaining the "hot spot" with the least expenditure of fuel, while permitting a rapid drop in temperature from that "hot spot" to the cool spot without an excessive loss of heat units between the two spots.

In the preferred form of application of my invention, I have provided a reduced portion or neck between the rearward or melting portion and an adjacent chamber, the forward end of which corresponds with the desired location of the aforementioned "cool spot", and I have discovered by experiments that the provision of, and the proper selection of, the size of the reduced portion are important factors in the suitable location and maintenance at fixed points longitudinally of the furnace of the hot and cool spots.

From observations made by variations of a particular furnace structure, I have ascertained that while maintaining the desired melting temperature of 2650° F. at the "hot spot" and the desired temperature of 2300° F. at the cool spot, variations in the proportionate widths of the reduced neck and the melting chamber have resulted in variations in the location of the "hot spot" and I have further determined that if this "hot spot" is located relatively close to the rear wall of the furnace, the operation becomes inefficient and the furnace fails to produce a high proportion of "A" quality glass. Preferably, the reduced neck is located at the forward end of what may be termed the melting zone, which zone may be calculated in the usual manner and may be roughly recognized as the zone "under the fire". I have found it highly desirable to maintain the "hot spot" at a point forward of the rear wall a distance equal to at least 60% of the length of the melting end, and that the nearer this spot approaches the extreme forward end of the melting chamber, the better the operation.

In the experiments above referred to, I have ascertained that in order to locate the "hot spot" forwardly of the point 60% of the distance from the rear wall of the melting chamber, the neck should not materially exceed 30% of the width of the melting compartment, and that a reduction of the neck from 30% to approximately 22% gradually moves the "hot spot" forwardly of the melting zone and that when the width of neck is 22% the hot spot is immediately at the melting chamber end of the neck. A further reduction of the neck does not of itself materially change the location of this "hot spot", though it may permit, if desired, a movement rearwardly of the cool spot. A further reduction, however, of the neck may give other advantages hereinafter to be described.

It is believed that the rule determined by these experiments will apply to furnaces of different characteristics within reasonable limits, though changes in the radiation characteristics of the cooling end, and perhaps in certain characteristics of the melting end, may modify the rule properly to be applied to other furnaces to some extent. My experiments, however, demonstrated that a very decided advantage and improvement in the melting of glass may be accomplished by the use of a reduced neck in accordance with the rule above set out, and if the neck width is from 10% to 35% of the width of the melting end of the furnace. It is believed that the rules laid down above on the basis of the foregoing experiments will not be modified in other structures beyond the limits just above stated as to the width of the neck.

The drawings show to scale two furnaces which have been successfully employed. These furnaces are closer to the extremes in size rather than to the average, the furnace shown in Figs. 1, 2, etc. being smaller than the normal and having an out-put of ten tons of glass per day, and that shown in Fig. 6 being abnormally large with an out-put of approximately 175 tons of glass per day.

The dimensions of the smaller tank are: width 9' 6"; length from rear wall of melting compartment to neck 15'; length from forward side of first neck to rear side of second neck 9'; width of first neck 2' 6"; length of first neck 30"; glass depth 18".

The dimensions of the tank illustrated in Fig. 6 are: width 31'; length from rear wall of melting compartment to neck 77'; length from forward side of first neck to rear of second neck 31' 6"; width of first neck 10' 8"; length of first neck 12'; glass depth 5'.

Figure 9:
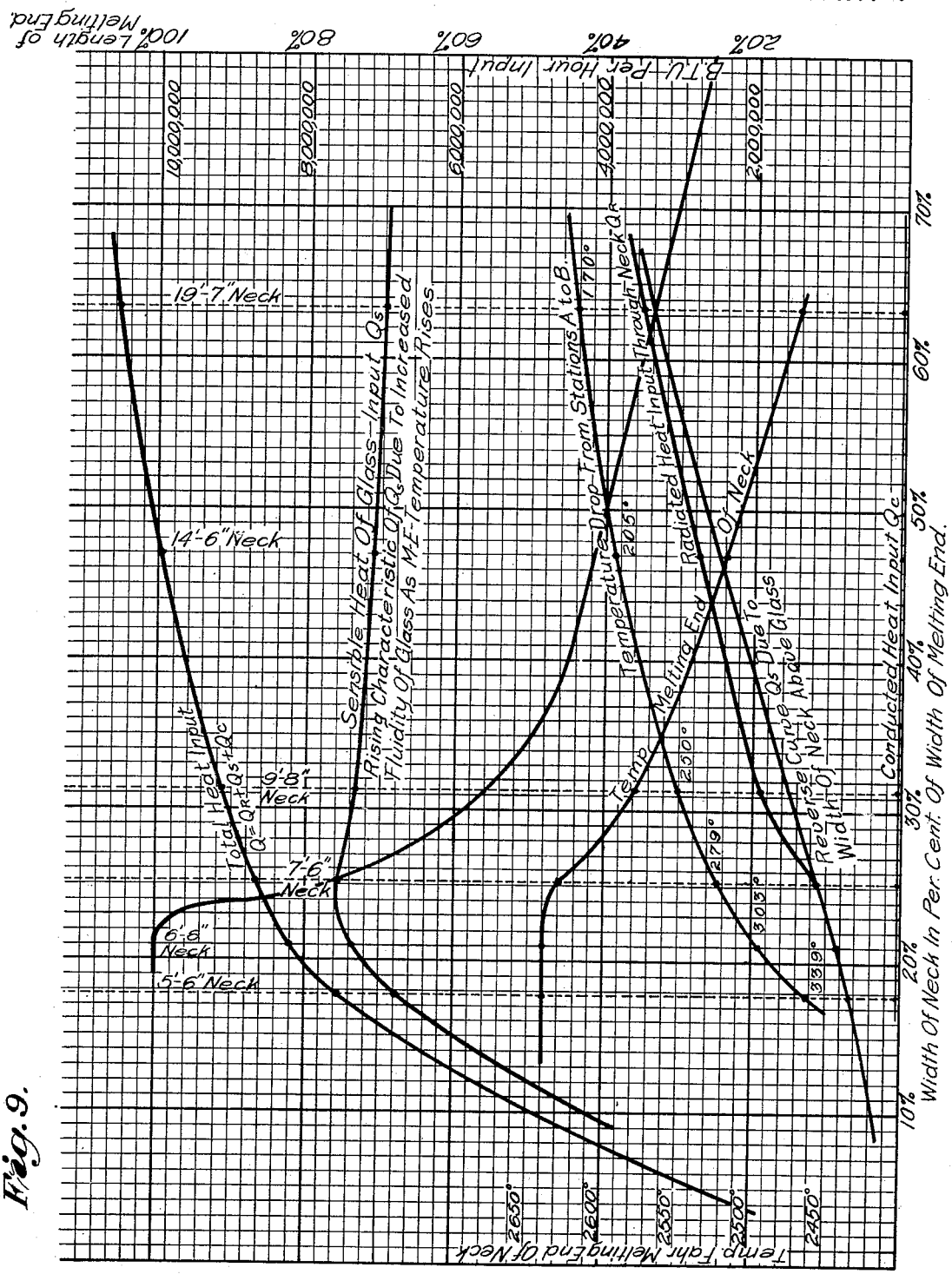
Fig. 9 is a composite graph showing various results obtained from measurements taken of operating conditions in the tank shown in Fig. 6.

The graph shown in Fig. 9 is based on experiments performed on the larger tank, and the results obtained therein have been confirmed by somewhat similar calculations and measurements made in connection with the small tank. In making these graphs, the temperature at the cool spot indicated at A in Fig. 1 was at all times held constant at 2300° F., and the cool spot was maintained at the position indicated in the figures. At the same time, the temperature of the hot spot was maintained constant at 2650° F., but this spot was movable and the amount which this spot moved rearwardly from the melting end of the neck is indicated in the graph in terms of percentage of length of the melting end.

From a study of the graph it will be obvious that the optimum neck width is between 15 and 20% of the width of the melting end. This width maintains the temperature of the melting end of the neck at approximately 2650° F. and maintains the hot spot directly at the end of the neck. As previously pointed out, the neck width may be varied between 10 and 35%, but when the width of the neck is over 28%, the hot spot in the particular furnace normally is slightly within the rear 60% of the melting portion of the tank. To a slight extent, the position of the hot spot may be regulated by a control of firing conditions and of heat radiated from a cooling compartment. This, however, is particularly inefficient and results in such a great consumption of fuel as to be commercially impractical.

Referring to the curve labelled "Sensible heat of glass input", it may be noted that the heat carried in the cooling chamber through the neck by the movement of the glass approaches its maximum when the neck width is approximately 25% of the width of the melting end of the tank, but as the neck is widened the amount of heat thus put in drops. This is because of the fact that the hot spot moves rearwardly as the neck is widened, hence the temperature of the melting end of the neck drops. Due to the dropping of the temperature differential between the cool spot and that of the glass at the melting end of the neck, the flow of glass through the neck is lessened and this also lessens the sensible heat input.

While I have described in detail and somewhat specifically the embodiments and method of my invention, it is understood that various changes may be made therein without departing from the the scope of the following claims.

I claim as my invention:

1. A continuous glass making furnace having a melting compartment and a refining compartment, a neck of lesser width than either of said compartments therebetween, said neck having a depth equal to that of one of said compartments, and means for creating and maintaining a predetermined area in the glass in the melting compartment immediately behind the entrance to said neck at a higher temperature than any other parts of the furnace.

2. The method of making glass which comprises supplying glass forming materials to molten glass in a furnace having a melting chamber and a cooling chamber separated by a passage of cross sectional area less than that of either of said chambers and permitting free surface flow of glass therebetween, applying heat from above the upper surface of glass in the furnace to heat the glass, and regulating said heat to create an area of highest temperature in the glass within the latter 40% of the melting chamber.

3. A continuous glass making furnace having a greater length than width, comprising side walls and a bottom, the side walls being shaped with two pairs of oppositely disposed, inwardly extending portions, whereby two channels of lesser width than the remainder of said furnace are formed, said channels extending from the bottom of the tank to a point above the normal glass level, means for heating glass in the tank to the rear of one of said channels, and means for withdrawing glass from the tank beyond the front of the other of said channels.

4. In the method of making glass a furnace having a melting and a cooling chamber connected by a neck of lesser width than said chambers, which comprises directing the heat into the melting end of the furnace to create a zone of high temperature in the melting chamber adjacent the end of the neck with such intensity that a thermo-syphon circulation will be set up in the glass sufficient to cause glass to pass forwardly through the neck in an amount at least eight times as great as the amount withdrawn from the furnace during the same period.

5. The method of making glass in a tank having a melting chamber and a cooling chamber separated by a reduced neck permitting a full depth flow of glass therethrough, which comprises maintaining a maximum temperature on the glass in the melting chamber at a point adjacent the end of the neck.

6. A continuous fuel-fired glass making furnace comprising a glass containing basin adapted to contain molten glass up to a predetermined normal level and divided into a melting compartment and a refining compartment by a passage of less cross sectional area than either of said compartments, which passage is constructed and arranged to permit free surface flow of glass between said compartments, means for creating and maintaining a predetermined area in the glass in the melting compartment adjacent to said passage at a higher temperature than the glass in other parts of said basin, and means for partially heat separating said area from said refining compartment above the normal level of the glass in the basin.

7. The method of making glass which comprises establishing a bath of molten glass in a glass making tank, having a glass containing basin divided into a melting compartment and a refining compartment by a passage of less cross sectional area than said compartments and constructed and arranged to permit free surface flow of glass therebetween, supplying batch to the bath at a position adjacent to one end of the melting compartment of the tank, applying flame to the surface of the bath to create a surface circulation of the glass toward the batch feeding end of the tank commencing at a point at least 60% of the length of said melting compartment measured from the batch feeding end of the portion of the glass bath to which the flame is applied.

8. The method of making glass which comprises establishing a bath of molten glass in a melting tank having a glass containing basin divided into a melting compartment and a refining compartment by a passage of less cross sectional area than said compartments and constructed and arranged to permit free surface flow of glass therebetween, supplying glass making batch to the bath near one end thereof, applying a flame to the surface of the glass and batch in the bath to melt the batch, controlling the heat gradient of the glass beneath the flames to create a surface circulation toward the end of the tank to which batch is supplied commencing at a point at least sixty per cent of the length of said melting compartment measured from the batch feeding end thereof, and causing a surface circulation of the glass in the opposite direction from said point.

WALTER O. AMSLER.

CERTIFICATE OF CORRECTION.

Patent No. 1,941,778.                                                    January 2, 1934.

WALTER O. AMSLER.

It is hereby certified that error appears in the printed specification of the above numbered patent requiring correction as follows: Page 1, line 71, for "subsantially" read substantially; and line 98, for "furance" read furnace; page 2, after line 55, insert the words "provisions in existing tanks has increased the"; and that the said Letters Patent should be read with these corrections therein that the same may conform to the record of the case in the Patent Office.

Signed and sealed this 6th day of Februay, A. D. 1934.

F. M. Hopkins (Seal)                                        Acting Commissioner of Patents.